L. PURPURA.
HYDRAULIC MOTOR.
APPLICATION FILED MAR. 22, 1915.
1,175,988.
Patented Mar. 21, 1916.
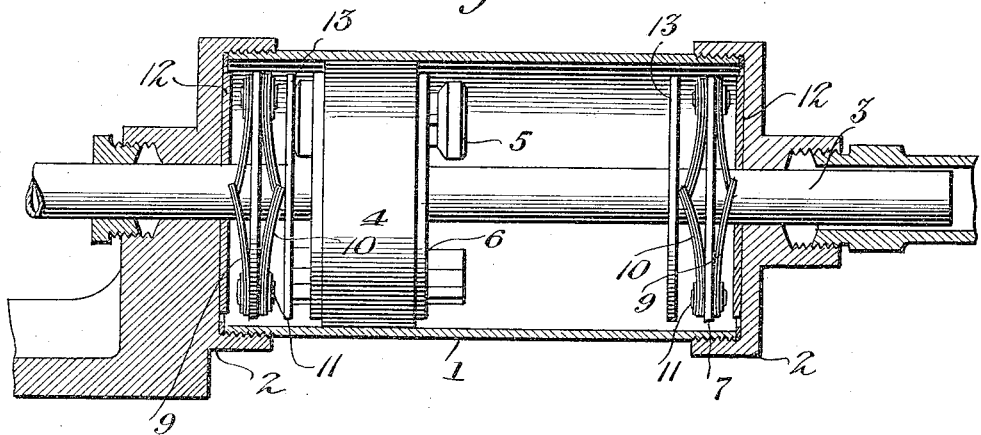
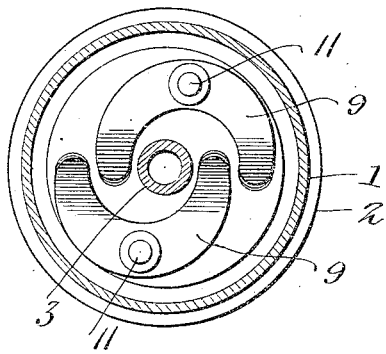
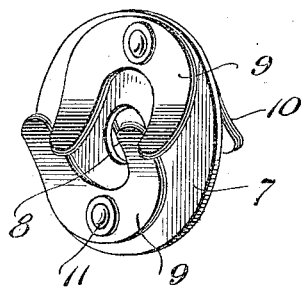
Inventor
Liborio Purpura

UNITED STATES PATENT OFFICE.

LIBORIO PURPURA, OF WHEELING, WEST VIRGINIA.

HYDRAULIC MOTOR.

1,175,988.   Specification of Letters Patent.   Patented Mar. 21, 1916.

Application filed March 22, 1915. Serial No. 16,071.

*To all whom it may concern:*

Be it known that I, LIBORIO PURPURA, a citizen of the United States, residing at Wheeling, in the county of Ohio and State of West Virginia, have invented certain new and useful Improvements in Hydraulic Motors, of which the following is a specification.

The invention relates to an improvement in hydraulic motors, particularly of the type wherein the valves controlling the pressure of the water with respect to the piston are shifted at the terminal of the piston stroke by springs or their equivalents. It has been heretofore proposed to operate or shift the valve by spring members at the respective strokes of the piston, but in every instance the springs have been responsive to a limiting head or pressure only of the water, so that springs which would respond to a comparatively light head or pressure would be ineffective under a heavy pressure or head, while springs responsive to a heavy head or pressure would be ineffective under a light head or pressure.

It is the object of the present invention to equip the motor with the valve shifting elements in the form of a spring member, and to so construct this member as to have it equally effective under a light or heavy pressure of water.

The invention will be described in the following specification, reference being had particularly to the accompanying drawings, in which:

Figure 1 is a longitudinal section partly in elevation of the cylinder illustrating the improved spring means. Fig. 2 is a sectional view through the casing and to one side of the plate carrying the springs. Fig. 3 is a perspective view of the spring member.

Referring particularly to Figs. 1, 2 and 3 of the drawings wherein the illustration is designed more particularly for illustrating the spring shifting means. It will be noted that I have illustrated a motor cylinder 1 having removable heads 2, the hollow piston rod 3 serving as a medium for the flow of water beyond the cylinder. Within the cylinder is arranged a piston 4 carried by the piston rod, or rods, the specific construction of the piston being immaterial in the present invention, it being sufficient to state that the said piston is constructed in accordance with any well known type in which the flow of water to opposite sides thereof is controlled through the medium of valves 5 and 6. It is obvious therefore that these valves must be shifted at each stroke of the piston with a quick positive action in order to direct the water flow in accordance with the requirements of the motor. It has been proposed to provide spring members for accomplishing this action, and the use of these member has been found satisfactory, so long as the springs thereof were of the strength to accord with a certain definite water pressure, and such water pressure was maintained during the operation of the motor. If, however, the same motor was used with water under a less pressure, the springs were too stiff to respond and hence their effectiveness impaired, while if a considerably higher pressure is used the springs were too weak to respond, hence a corresponding ineffectiveness.

I provide spring operating members for the purpose designed wherein conditions will accommodate themselves to the water pressure, the spring member being responsive to any pressure between any predetermined limitation. To secure this I provide spring members at each end of the cylinder, each member including a plate 7 of somewhat less diameter than the interior of the cylinder and centrally formed with an opening 8 to receive the piston rod. On opposite sides of the plates 7 are secured spring sections 9 and 10, the sections 9 being arranged on one side of the plate and the sections 10 on the opposing side of the plate. In form the sections are practically identical, each being of approximate U-shape in plan with their pointed ends curved laterally with respect to the remainder. The sections on each side of the plate are secured in diametrically opposed relation as at 11, with, however, the arms extending toward the center of the plate and approximately on lines parallel to each other and to a tangential line drawn at right angles to the diameter, joining the free terminals of the sections. The sections 9 and 10 are so secured that their outwardly curved portions thus present a line of projection beyond the surface of the plate and diametrically thereof, the extreme terminals of one section lapping the terminals of the other section. These respective sections 9 and 10 are as previously stated, disposed on opposite sides of the plate 7, and to secure the desired result are of different spring strengths. For example each section 9 may be made up of two spring strips while the section 10 is made up of three or more identical strips. This provides a spring member including a guide plate and spring portions on opposite sides thereof with the respective spring portions of different strengths.

The spring members are arranged in the cylinder between end plates 12 and bearing plates 13, the latter being disposed next the piston so that the valves will contact with said plates 13 and press the latter against the springs but correspondingly acted upon. As the spring members thus have different spring portions it is obvious that a lower pressure or head of water will compress the spring portions 9, while the higher pressure will affect the spring portions 10, the spring portions 9 under the higher pressure being flattened and in effect a part of the plate. The spring member thus provided adapts the motors for use with either high or low pressure, taking care effectively of the valve movement under extremes or intermediate water pressure.

What is claimed is:

1. A valve operating element for hydraulic motors including a plate, a plurality of springs secured to each side of the plate, springs on one side of the plate having a different compressive strength from the springs on the opposite side of the plate.

2. A valve operating element for hydraulic motors including a plate, a plurality of springs secured to each side of the plate, springs on one side of the plate having a different compressive strength from the springs on the opposite side of the plate, each of said springs being of U-form with their ends curved outwardly from the plate.

3. A valve operating element for hydraulic motors including a plate, a plurality of springs secured to each side of the plate, springs on one side of the plate having a different compressive strength from the springs on the opposite side of the plate, each of the springs being of U-form and having outwardly curved ends arranged diametrically of the plate.

4. The combination with a hydraulic motor including a cylinder, and a piston operable therein, of a spring member arranged between the head of the cylinder and the piston, and including a plate loose in the cylinder and spring sections secured on opposite sides of the plate.

5. The combination with a hydraulic motor including a cylinder, and a piston operable therein, of a spring member arranged between the head of the cylinder and the piston, and including a plate loose in the cylinder and spring sections secured on opposite sides of the plate, said sections being of U-form with their terminals normally spaced from the plate.

6. The combination with a hydraulic motor including a cylinder, and a piston operable therein, of a spring member arranged between the head of the cylinder and the piston, and including a plate loose in the cylinder and spring sections secured on opposite sides of the plate, the sections on one side of the plate being of greater spring strength than the sections on the other side of the plate.

7. The combination with a hydraulic motor including a cylinder, and a piston operable therein, of a spring member arranged between the head of the cylinder and the piston, and including a plate loose in the cylinder and spring sections secured on opposite sides of the plate, each section being of U-form and secured to the plate to present their free ends practically in alinement diametrically of the plate.

8. A hydraulic motor including a cylinder, a head therefor, a piston operable within the cylinder, a plate arranged in the cylinder between the piston and head, spring sections secured to that surface of the plate next the head, and spring sections secured to that surface of the plate next the piston, the latter spring section being of greater strength than the former.

In testimony whereof, I affix my signature in presence of two witnesses.

LIBORIO PURPURA.

Witnesses:
 WM. F. WEIR,
 BARTOLOMEO PURPURA.

Copies of this patent may be obtained for five cents each, by addressing the "Commissioner of Patents, Washington, D. C."